United States Patent
Yuda et al.

(10) Patent No.: US 6,988,027 B2
(45) Date of Patent: Jan. 17, 2006

(54) ELECTRIC POWER STEERING SYSTEM

(75) Inventors: Masato Yuda, Wako (JP); Mitsunori Kawashima, Wako (JP); Hiroaki Ishigaki, Haga-machi (JP)

(73) Assignees: Honda Motor Co., Ltd., Minato-ku (JP); Showa Corporation, Gyoda (JP)

(*) Notice: Subject to any disclaimer, the term of this patent is extended or adjusted under 35 U.S.C. 154(b) by 0 days.

(21) Appl. No.: 10/926,537

(22) Filed: Aug. 25, 2004

(65) Prior Publication Data

US 2005/0085971 A1    Apr. 21, 2005

(30) Foreign Application Priority Data

Aug. 27, 2003   (JP)   .............................. 2003-302626
Aug. 27, 2003   (JP)   .............................. 2003-302627

(51) Int. Cl.
*G06F 7/00*   (2006.01)
*B62D 6/00*   (2006.01)

(52) U.S. Cl. .................. 701/41; 180/402; 180/443; 180/6.2; 73/862.3; 73/1.11; 73/118.1; 701/42; 701/43; 701/44

(58) Field of Classification Search .......... 701/41–44, 701/1, 22, 36; 180/443, 446, 403, 480, 6.2; 318/663, 432, 489, 664; 73/862.3, 1.11, 73/118.1; G06F 7/00; B62D 5/04
See application file for complete search history.

(56) References Cited

U.S. PATENT DOCUMENTS

| | | | | |
|---|---|---|---|---|
| 5,097,420 A | * | 3/1992 | Morishita ..................... 701/43 |
| 5,259,473 A | * | 11/1993 | Nishimoto ................... 180/446 |
| 5,271,471 A | * | 12/1993 | Sasaki ......................... 173/178 |
| 5,271,474 A | * | 12/1993 | Nishimoto et al. ......... 180/446 |
| 5,307,892 A | * | 5/1994 | Phillips ....................... 180/422 |
| 5,360,077 A | * | 11/1994 | Nishimoto et al. ......... 180/446 |
| 5,406,834 A | * | 4/1995 | Taniguchi ................... 73/118.1 |
| 5,448,482 A | * | 9/1995 | Yamamoto et al. .......... 701/41 |
| 5,699,874 A | * | 12/1997 | Miyaura ..................... 180/443 |
| 5,920,174 A | * | 7/1999 | Kawada et al. ............. 318/663 |
| 6,018,691 A | * | 1/2000 | Yamamoto et al. .......... 701/41 |

(Continued)

FOREIGN PATENT DOCUMENTS

JP   2000-190861   7/2000

(Continued)

*Primary Examiner*—Cuong H. Nguyen
(74) *Attorney, Agent, or Firm*—Hamre, Schumann, Mueller & Larson, P.C.

(57) ABSTRACT

In an electric power steering system, during initial processing after an ignition switch is turned on, when a main CPU completes calculation of an offset voltage, it sends an offset voltage calculation request signal to a sub CPU. When the time from sending the offset voltage calculation request signal until the main CPU receives an offset voltage calculation completion signal from the sub CPU is within a predetermined period of time, it is determined that a communication function between the main CPU and the sub CPU and an offset voltage calculation function of the sub CPU are normal, and at the same time it is possible to maintain synchronism of the offset voltage calculation in the main CPU with the offset voltage calculation in the sub CPU. Thus, it is possible to carry out in a short time a check of the communication function between the main CPU and the sub CPU, while maintaining the synchronism in the offset voltage calculations by the two CPUs when calculating an actual motor current.

4 Claims, 8 Drawing Sheets

U.S. PATENT DOCUMENTS

| | | | |
|---|---|---|---|
| 6,392,854 B1 * | 5/2002 | O'Gorman | 361/31 |
| 6,502,025 B1 * | 12/2002 | Kempen | 701/41 |
| 6,718,242 B1 * | 4/2004 | Mori et al. | 701/41 |
| 6,782,969 B2 * | 8/2004 | Kodama et al. | 180/446 |
| 2004/0129490 A1 * | 7/2004 | Kodama et al. | |

FOREIGN PATENT DOCUMENTS

| | | | |
|---|---|---|---|
| JP | 2002008313 A | * | 1/2002 |
| JP | 2002217521 A | * | 7/2002 |
| WO | WO 9611831 | * | 4/1996 |

* cited by examiner

ELECTRIC POWER STEERING SYSTEM

FIELD OF THE INVENTION

The present invention relates to an electric power steering system in which a steering operation by a driver is assisted by a motor, and more particularly to an electric power steering system that includes a main CPU and a sub CPU, the main CPU carrying out control so that a current detected by motor current detection means coincides with a target current, and the sub CPU being capable of communicating with the main CPU so as to monitor the main CPU.

BACKGROUND OF THE INVENTION

Japanese Patent Application Laid-open No. 2000-190861 discloses an arrangement in which an electric power steering system is provided with motor drive disabling means for disabling the drive of a motor so that the motor, which assists a steering operation by a driver, is prohibited from generating a torque in a direction opposite to the direction of a steering torque applied to a steering wheel by the driver.

There is also a known arrangement in which an electronic control unit of an electric power steering system is provided with a main CPU (central processing unit) for carrying out main control of a motor and a sub CPU for monitoring the main CPU, and the sub CPU takes on the above-mentioned motor drive disabling function.

The main CPU has a function of calculating the actual current flowing through the motor in order to carry out current feedback control for making the actual current of the motor coincide with a target current, and similarly the sub CPU has a function of calculating the actual current of the motor in order to prevent a flow of current that has been prohibited by the motor drive disabling function. In both the main CPU and the sub CPU, the actual current of the motor is calculated based on a difference in voltage between opposite ends of a shunt resistor connected to an H-bridge circuit for driving the motor. However, since a predetermined offset voltage is detected due to variation in the motor current detection circuit and change in temperature even when no current is passing through the shunt resistor, a current value is calibrated with this offset voltage to be determined as the actual current of the motor.

However, if the timing with which the main CPU calculates the offset voltage and the timing with which the sub CPU calculates the offset voltage differ from each other, there is a possibility that different offset voltages might be obtained by the main CPU and the sub CPU due to variation in the power source voltage caused by the engine starting, etc., and in order to prevent this from happening it is necessary to provide a communication function between the main CPU and the sub CPU, and to synchronize, using this communication function, the timing of the offset voltage calculations of the main CPU and the sub CPU.

When a communication function between the main CPU and the sub CPU is provided in this way, it is necessary to diagnose whether or not this communication function is working normally, and furthermore, after the diagnosis it is necessary to carry out communication between the main CPU and the sub CPU in order to synchronize the timing with which the offset voltage is calculated, resulting in a problem that it takes time for the electric power steering to function normally after the engine is started.

SUMMARY OF THE INVENTION

The present invention has been achieved under the above-mentioned circumstances, and it is an object thereof to carry out in a short time a check of a communication function between a main CPU and a sub CPU of an electric power steering system, while maintaining synchronism in offset voltage calculations by the two CPUs when calculating an actual motor current.

In order to accomplish this object, in accordance with a first aspect of the present invention, there is proposed an electric power steering system comprising: a motor for assisting a driver with a steering operation; motor current detection means for detecting a current supplied to the motor; a main CPU for carrying out control so that the current detected by the motor current detection means coincides with a target current; and a sub CPU capable of communicating with the main CPU so as to monitor the main CPU; the main CPU and the sub CPU individually calculating an offset voltage of the motor current detection means in order to calibrate the motor current detection means, wherein the main CPU calculates the offset voltage and at this timing sends an offset voltage calculation request signal to the sub CPU, and it is determined that a communication function between the main CPU and the sub CPU and an offset voltage calculation function of the sub CPU are normal when the time from sending the offset voltage calculation request signal until the main CPU receives an offset voltage calculation completion signal from the sub CPU is within a predetermined period of time.

In accordance with this arrangement, the main CPU sends the offset voltage calculation request signal to the sub CPU at the same timing when the main CPU calculates the offset voltage of the motor current detection means; it is confirmed whether or not the time from sending the signal until the main CPU receives the offset voltage calculation completion signal from the sub CPU is within the predetermined period of time; and when it is within the predetermined period of time, it is determined that the communication function between the main CPU and the sub CPU is normal and the offset voltage calculation function of the sub CPU is normal. Therefore, it is possible to not only reliably synchronize calculation of the offset voltage in the main CPU with calculation of the offset voltage in the sub CPU, but also to confirm in a short time whether or not the communication function between the main CPU and the sub CPU is normal and whether or not the offset voltage calculation function of the sub CPU is normal, by utilizing the transmission and reception of the calculation request signal and the calculation completion signal.

Furthermore, in accordance with a second aspect of the present invention, in addition to the first aspect, the main CPU and the sub CPU are independently capable of calculating the actual current of the motor, the sub CPU sets a port connecting the main CPU and the sub CPU to a high level when the actual current of the motor detected by the sub CPU is equal to or greater than a threshold value, and sets the port to a low level when the detected actual current is less than the threshold value, and the main CPU compares the actual current of the motor detected by the main CPU with the port level to determine whether or not the sub CPU has locked up.

In accordance with this arrangement, the main CPU and the sub CPU, which are connected to each other via the port and are capable of communicating with each other, independently calculate the actual current of the motor, and the sub CPU sets the port to the high level when the calculated actual current of the motor is equal to or greater than the threshold value and sets the port to the low level when the calculated actual current is less than the threshold value. Then, the main CPU compares the actual current of the motor calculated by itself with the port level, and if they do not coincide, it is determined that the sub CPU has locked up. Moreover, since the signal that the main CPU receives from the sub CPU is a port level signal alone, it is possible to minimize an increase in the load on the main CPU.

Moreover, in accordance with a third aspect of the present invention, in addition to the second aspect, when the actual current of the motor calculated by the main CPU is equal to or greater than an upper limit value if a state in which the port is at the low level continues for a predetermined period of time or longer, it is determined that the sub CPU has locked up low.

In accordance with this arrangement, even though the actual current of the motor calculated by the main CPU is equal to or greater than the upper limit value, if the state in which the port is at the low level continues for the predetermined period of time or longer, it is determined that the sub CPU has locked up low. Therefore, it is possible to determine with good precision that the sub CPU has locked up low.

Furthermore, in accordance with a fourth aspect of the present invention, in addition to the second aspect, when the actual current of the motor calculated by the main CPU is equal to or less than a lower limit value if a state in which the port is at the high level continues for a predetermined period of time or longer, it is determined that the sub CPU has locked up high.

In accordance with this arrangement, even though the actual current of the motor calculated by the main CPU is equal to or less than the lower limit value, if the state in which the port is at the high level continues for the predetermined period of time or longer, it is determined that the sub CPU has locked up high. Therefore, it is possible to determine with good precision that the sub CPU has locked up high.

A motor current detection circuit 49 shown in FIG. 4 of an embodiment corresponds to the motor current detection means of the present invention.

The above-mentioned object, other objects, characteristics, and advantages of the present invention will become apparent from a preferred embodiment that will be described in detail below by reference to the attached drawings.

DETAILED DESCRIPTION OF THE INVENTION

Figure 1:
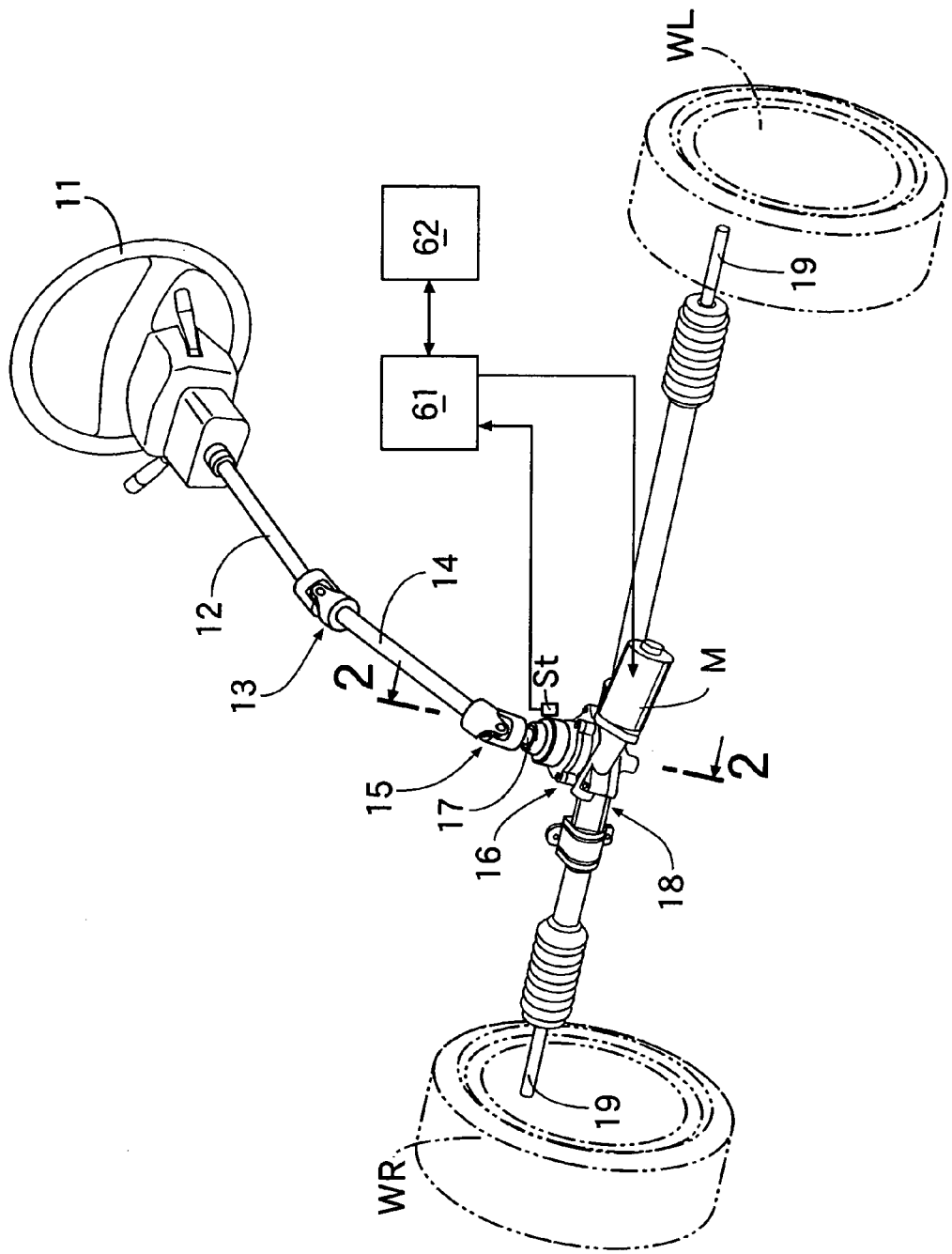
FIG. 1 is an overall perspective view of an electric power steering system.

As shown in FIG. 1, an upper steering shaft 12 rotating integrally with a steering wheel 11 is connected to a pinion shaft 17 via an upper universal joint 13, a lower steering shaft 14, and a lower universal joint 15, the pinion shaft 17 projecting upward from a reduction gear 16. Tie rods 19 project from left and right ends of a steering gearbox 18 connected to the lower end of the reduction gear 16 and are connected to knuckles (not illustrated) of left and right wheels WL and WR. A motor M is supported on the reduction gear 16, and operation of the motor M is controlled by an electronic control unit U, into which a signal is input from a steering torque sensor St housed within the reduction gear 16.

Figure 2:
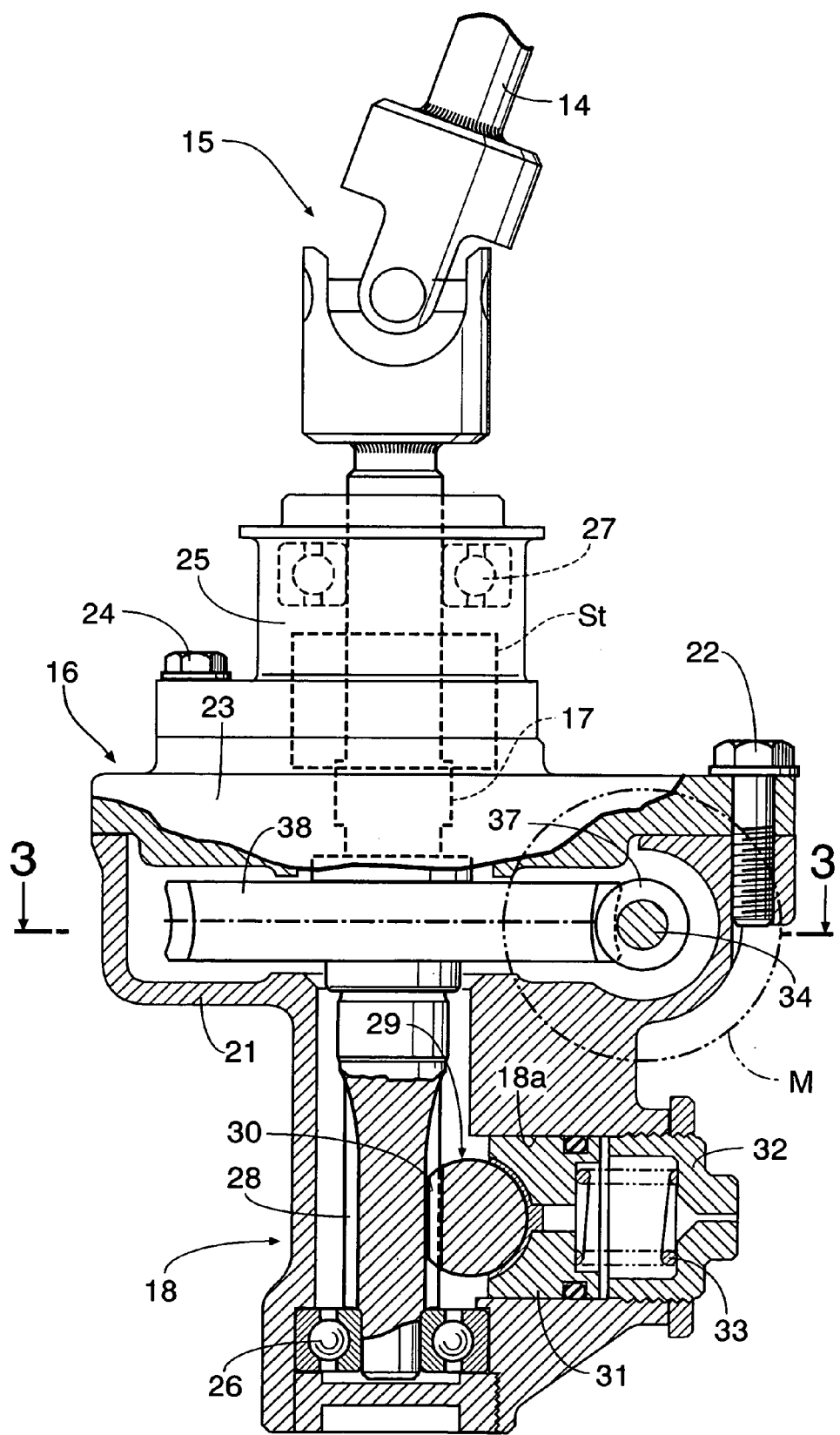
FIG. 2 is an enlarged sectional view along line 2—2 in FIG. 1.
Figure 3:
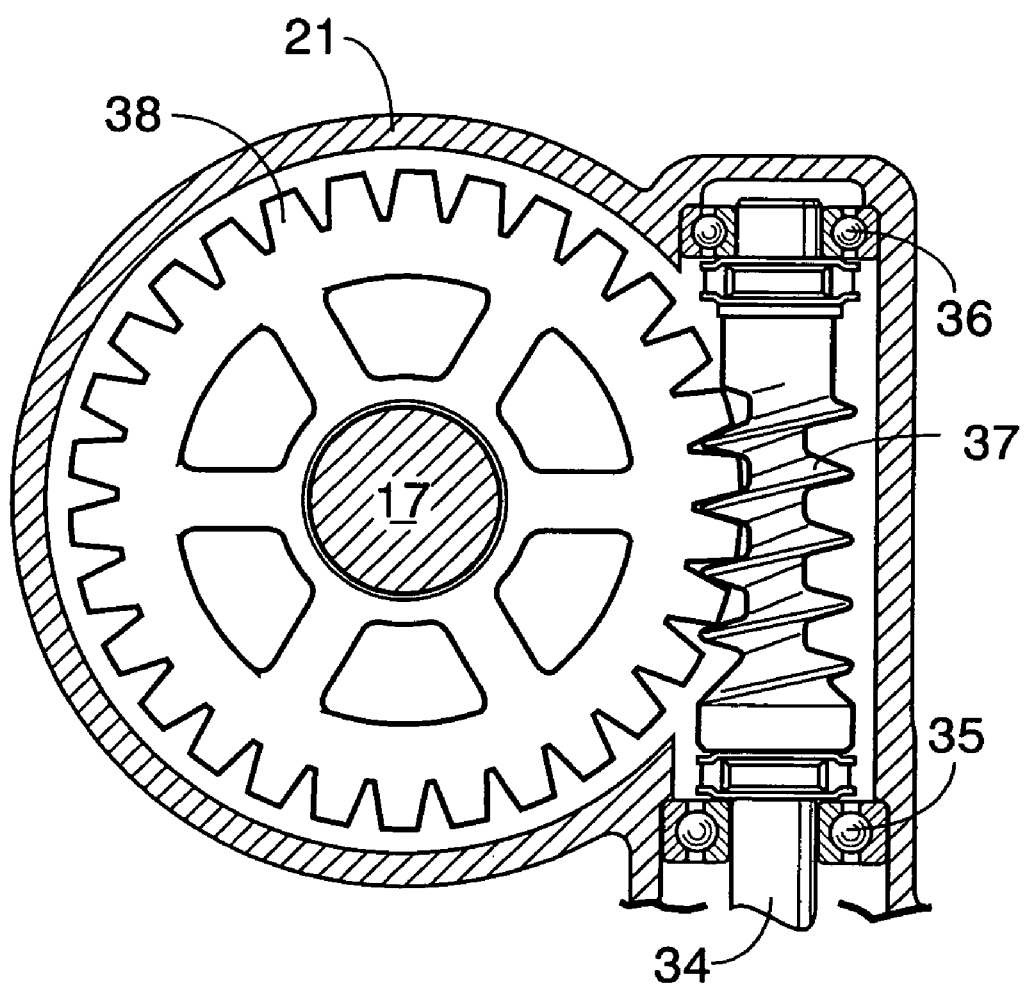
FIG. 3 is a sectional view along line 3—3 in FIG. 2.

As shown in FIG. 2 and FIG. 3, the reduction gear 16 includes a lower case 21, a middle case 23, and an upper case 25, the lower case 21 being integral with the steering gearbox 18, the middle case 23 being joined to an upper face of the lower case 21 by bolts 22, and the upper case 25 being joined to an upper face of the middle case 23 by bolts 24. The pinion shaft 17 is rotatably supported in the steering gearbox 18 and the upper case 25 via ball bearings 26 and 27. A pinion 28 provided at the lower end of the pinion shaft 17 meshes with a rack 30 provided on a rack bar 29 supported in a laterally movable manner within the steering gearbox 18. A pressing member 31 is slidably housed in a through hole 18a formed in the steering gearbox 18, and flexure of the rack bar 29 is suppressed by urging the pressing member 31 toward a back face of the rack bar 29 by means of a spring 33 disposed between the pressing member 31 and a nut 32 blocking the through hole 18a.

A rotating shaft 34 of the motor M, which extends into the interior of the reduction gear 16, is rotatably supported in the lower case 21 by a pair of ball bearings 35 and 36, and a worm 37 provided on the rotating shaft 34 of the motor M meshes with a worm wheel 38 fixed to the pinion shaft 17. When the motor M is driven, the torque of the rotating shaft 34 is therefore transmitted to the pinion shaft 17 via the worm 37 and the worm wheel 38, and a steering operation by a driver is thus assisted by the motor M.

Figure 4:
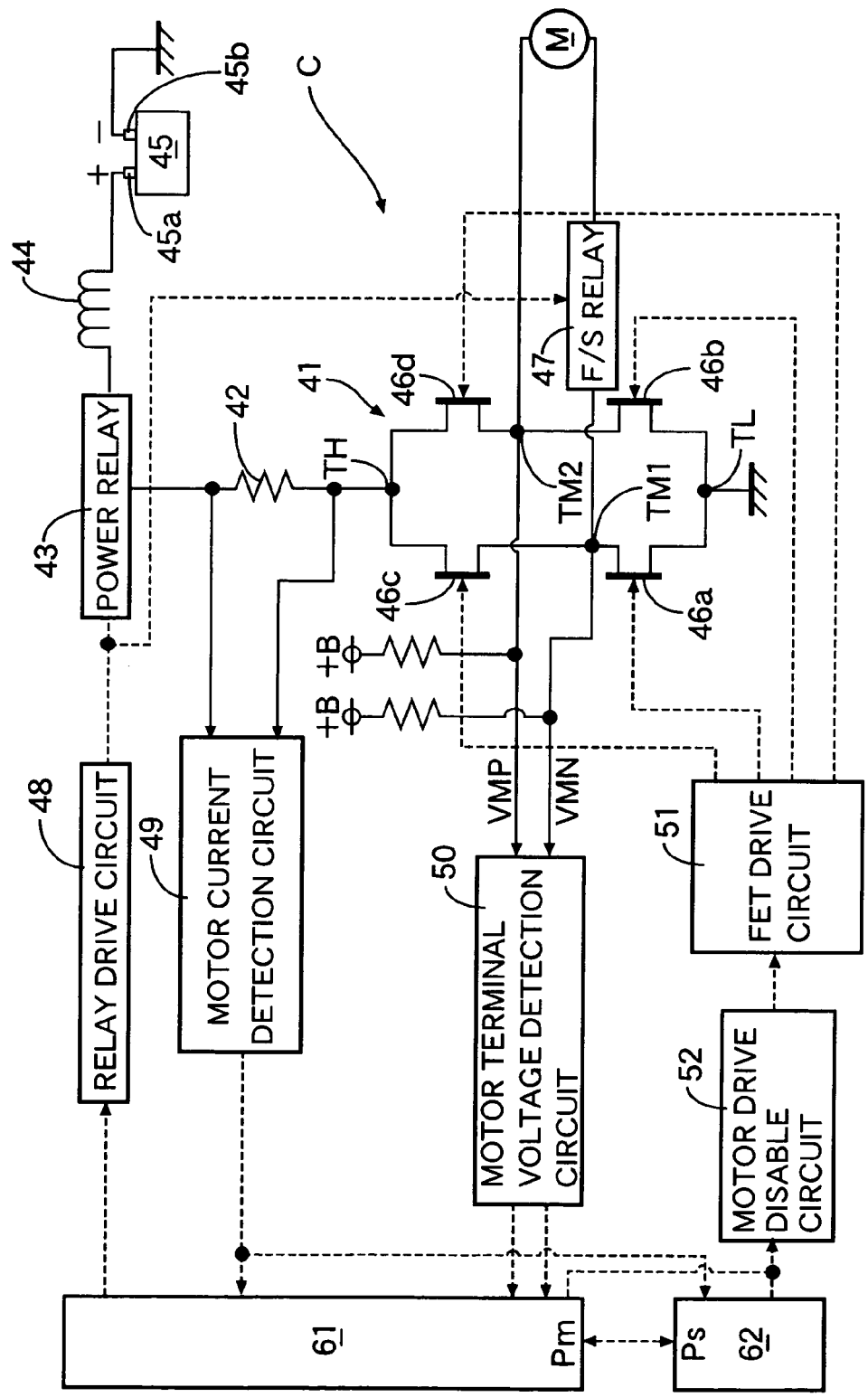
FIG. 4 is a diagram showing a drive circuit for a motor.

FIG. 4 shows a motor drive circuit C for driving the motor M with commands from a main CPU 61 and a sub CPU 62 connected to the main CPU 61. The motor drive circuit C includes an H-bridge circuit 41 in which a high voltage terminal TH is connected to a positive pole 45a of a vehicle-mounted 12V battery 45 via a shunt resistor 42, a power relay 43, and a choke coil 44, and a low voltage terminal TL is grounded and connected to a negative pole 45b of the battery 45. A first output terminal TM1 and a second output terminal TM2 of the H-bridge circuit 41 are connected to the motor M. The low voltage terminal TL and the first output terminal TM1 are connected to each other via a first switching element 46a. The low voltage terminal TL and the second output terminal TM2 are connected to each other via a second switching element 46b. The high voltage terminal TH and the first output terminal TM1 are connected to each other via a third switching element 46c. The high voltage terminal TH and the second output terminal TM2 are connected to each other via a fourth switching element 46d. The first to the fourth switching elements 46a to 46d are, for example, field-effect transistors (FET). A fail-safe relay 47 is disposed between the motor M and either the first output terminal TM1 or the second output terminal TM2 (the first output terminal TM1 in this embodiment).

The power relay 43, which turns ON and OFF the supply of power from the battery 45 to the H-bridge circuit 41, and the fail-safe relay 47, which stops the motor M when there is an abnormality, are connected to a common relay drive circuit 48 controlled by the electronic control unit U, and the power relay 43 and the fail-safe relay 47 are operated in association with each other to be turned ON and OFF. That is, when the power relay 43 is turned ON, the fail-safe relay 47 is also turned ON, and when the power relay 43 is turned OFF, the fail-safe relay 47 is also turned OFF, thereby reducing the cost and the failure rate of the relay drive circuit 48.

The shunt resistor 42, which is disposed between the power relay 43 and the H-bridge circuit 41, is connected to a motor current detection circuit 49 that is connected to both the main CPU 61 and the sub CPU 62, and detects the current supplied from the battery 45 to the H-bridge circuit 41 based on the potential difference between opposite ends of the shunt resistor 42 and the resistance of the shunt resistor 42.

A potential VMN of the first output terminal TM1 and a potential VMP of the second output terminal TM2, that is, the potentials of opposite terminals of the motor M, are detected by a motor terminal voltage detection circuit 50 connected to the main CPU 61. When the motor M is not operating, the potential VMN of the first output terminal TM1 and the potential VMP of the second output terminal TM2 are pulled up to 2 V to 3 V by the battery 45.

Figure 5A:
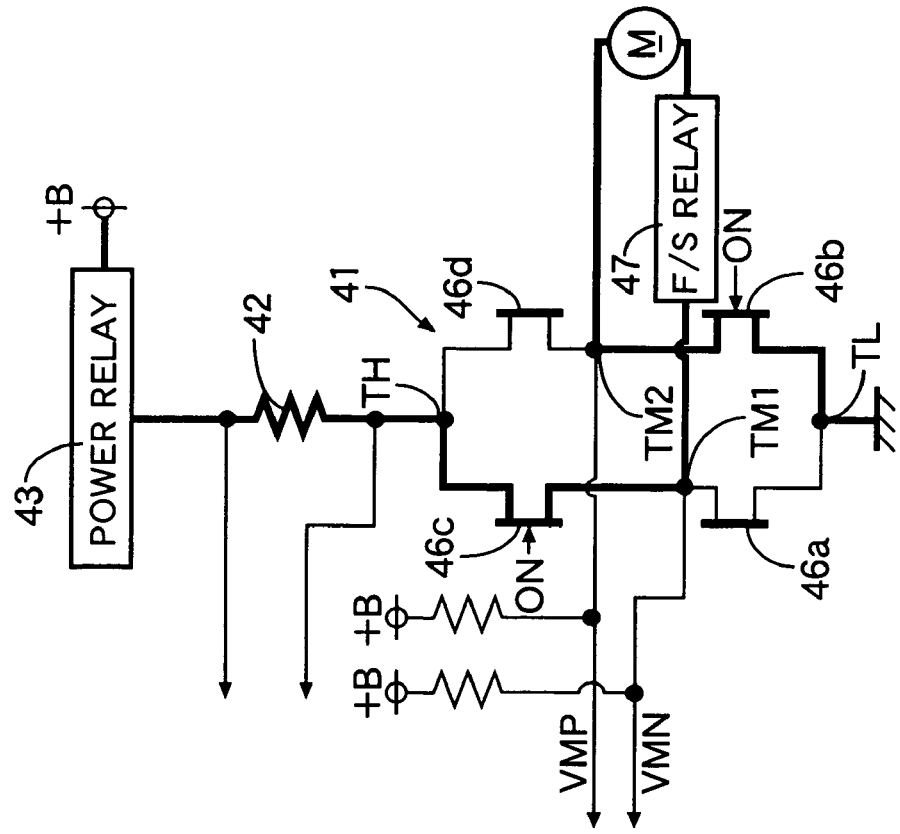
FIG. 5A is a diagram for explaining the operation when the motor rotates in forward and reverse directions.

The first to the fourth switching elements 46a to 46d of the H-bridge circuit 41 are duty-cycle controlled by a switching element drive circuit 51. That is, as shown in FIG. 5A, when the first switching element 46a and the fourth switching element 46d, which are arranged in a diagonal relationship, are turned ON, the first output terminal TM1 is connected to the low voltage terminal TL and becomes 0 V, the second output terminal TM2 is connected to the high voltage terminal TH and becomes 12 V, and therefore the motor M rotates in the forward direction. In this process, it is possible to control the current flowing through the motor M by controlling the duty ratio of either the first switching element 46a or the fourth switching element 46d.

Figure 5B:
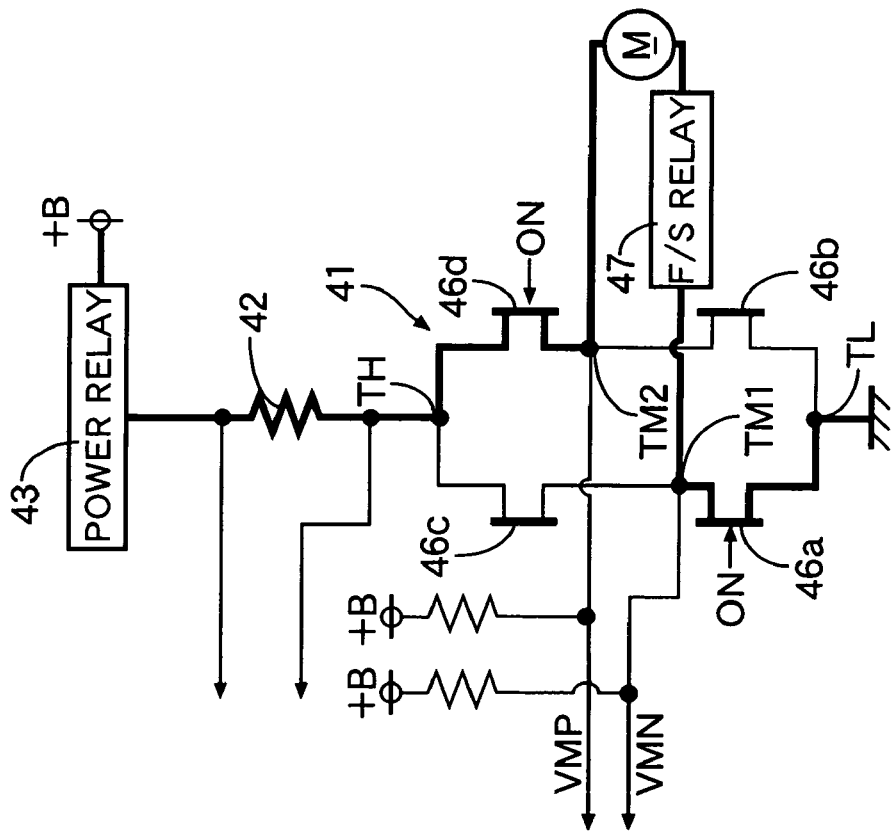
FIG. 5B is a diagram for explaining the operation when the motor rotates in forward and reverse directions.

As shown in FIG. 5B, when the second switching element 46b and the third switching element 46c, which are arranged in another diagonal relationship, are turned ON, the second output terminal TM2 is connected to the low voltage terminal TL and becomes 0 V, the first output terminal TM1 is connected to the high voltage terminal TH and becomes 12 V, and therefore the motor M rotates in the reverse direction. In this process, it is possible to control the current flowing through the motor M by controlling the duty ratio of either the second switching element 46b or the third switching element 46c.

A motor drive disable circuit 52 is disposed between the switching element drive circuit 51, and the main CPU 61 and the sub CPU 62. The sub CPU 62 has the function of monitoring the main CPU 61 and carries out monitoring so that the motor M is not driven in a direction opposite to the direction of a steering torque detected by the steering torque detection means St. When a state in which the motor M is driven in the opposite direction continues for a predetermined period of time, the sub CPU 62 outputs a motor drive disable signal to the switching element drive circuit 51 via the motor drive disable circuit 52.

The main CPU 61 has a function of calculating the actual current of the motor M based on a signal from the motor current detection circuit 49 in order to carry out current feedback control for making the actual current flowing through the motor M coincide with a target current. The sub CPU 62 has a function of calculating the actual current of the motor M based on a signal from the motor current detection circuit 49 in order to carry out motor drive disable control by means of the motor drive disable circuit 52. Furthermore, in order to calibrate the actual current of the motor M, the main CPU 61 and the sub CPU 62 respectively have a function of calculating an offset voltage (output voltage when no motor current flows) that is output by the motor current detection circuit 49 during initial processing immediately after an ignition switch is turned on. In order to eliminate the influence of variation in the voltage of the battery 45, it is necessary for the main CPU 61 and the sub CPU 62 to synchronizingly calculate the offset voltage. Moreover, a port Pm of the main CPU 61 and a port Ps of the sub CPU 62 are connected to each other for mutual communication, and a diagnosis as to whether or not the mutual communication can be carried out without problem and a diagnosis as to whether or not the actual current calculation function of the sub CPU 62 is normal, are carried out during the initial processing.

Figure 6:
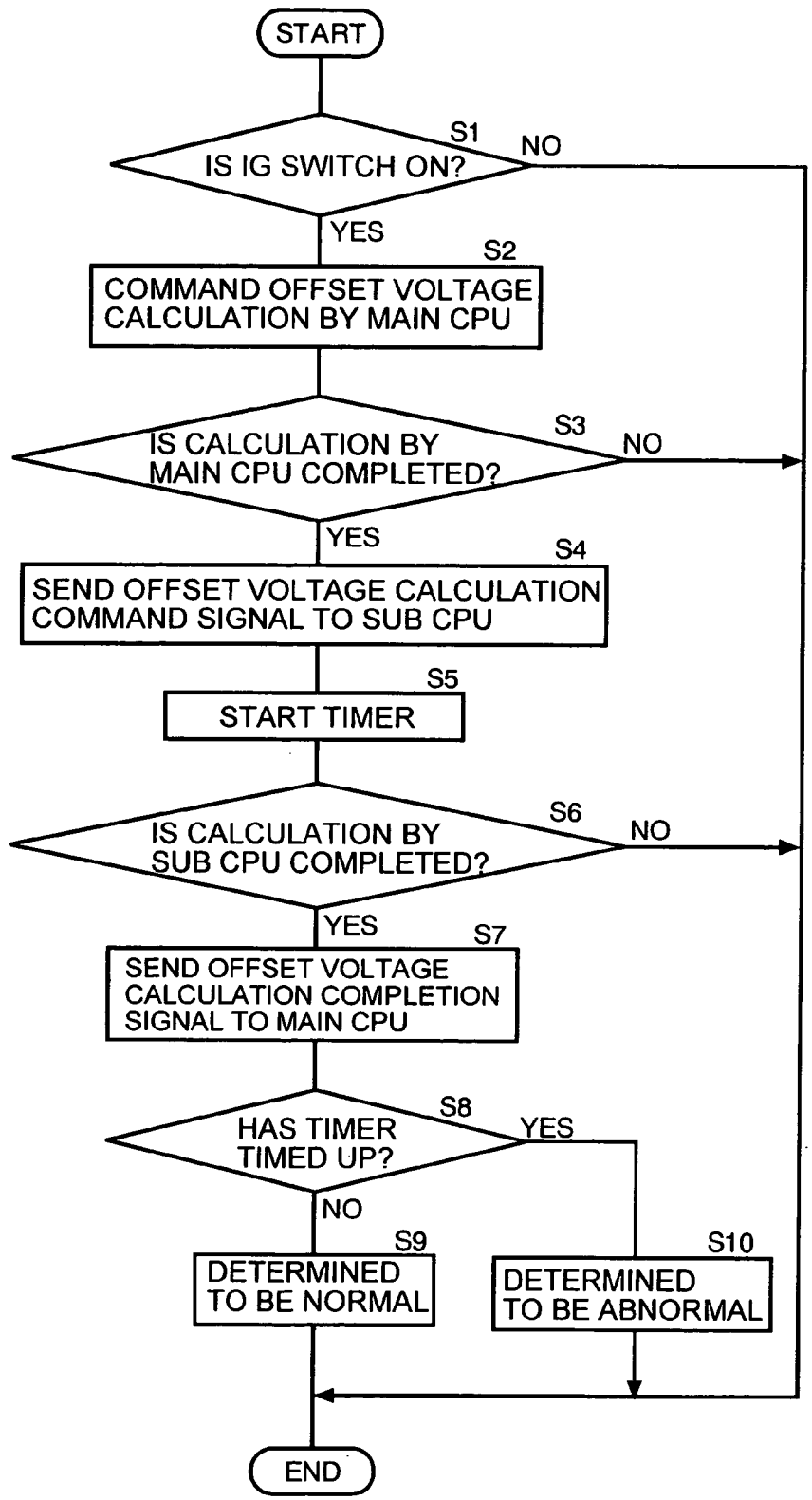
FIG. 6 is a flowchart for explaining failure diagnosis operations of a main CPU and a sub CPU.

Synchronization between the main CPU 61 and the sub CPU 62 for offset voltage calculation and diagnosis of the mutual communication function between the main CPU 61 and the sub CPU 62 are now explained with reference to the flowchart of FIG. 6.

Firstly, if in Step S1 the ignition switch is turned ON, then in Step S2 a command is issued for calculation of an offset voltage in the main CPU 61 based on a signal from the motor current detection circuit 49, and if in Step S3 calculation of the offset voltage is completed, then in Step S4 the main CPU 61 sends an offset voltage calculation command signal to the sub CPU 62 through communication between the main CPU 61 and the sub CPU 62, and concurrently in Step S5 a timer is started.

In the subsequent Step S6, if calculation of an offset voltage in the sub CPU 62 is completed, then in Step S7 the sub CPU 62 sends an offset voltage calculation completion signal to the main CPU 61 through communication between the main CPU 61 and the sub CPU 62. At this time, if in Step S8 the timer that started in Step S5 has not yet timed up, that is, if the offset voltage calculation completion signal has been sent from the sub CPU 62 to the main CPU 61 within a predetermined period of time specified by the timer, then in Step S9 it is determined that the situation is normal. In contrast, if in Step S8 the timer has timed up, that is, if no offset voltage calculation completion signal has been sent from the sub CPU 62 to the main CPU 61 within the predetermined period of time specified by the timer, then in Step S10 it is determined that the situation is abnormal.

As described above, if in Step S9 it is determined that the situation is normal, it is confirmed that the communication function between the main CPU 61 and the sub CPU 62 is normal, and that the offset voltage calculation in the sub CPU 62 has been carried out normally. Furthermore, since the offset voltage calculation in the main CPU 61 and the offset voltage calculation in the sub CPU 62 are synchronizingly carried out it is possible to prevent the occurrence of an error in offset voltage calculation between the main CPU 61 and the sub CPU 62 due to variation in the battery voltage, etc. Moreover, since confirmation as to whether the communication function between the main CPU 61 and the sub CPU 62 is normal or not is carried out by utilizing the communication for synchronizing the offset voltage calculations in the main CPU 61 and the sub CPU 62, it is possible to shorten the time for synchronization and confirmation during the initial processing after turning on the ignition switch, thus enabling the electric power steering system to immediately exhibit its function.

The diagnosis of the actual current calculation function of the sub CPU 62 is now explained with reference to the flowcharts of FIG. 7 and FIG. 8.

Figure 7:
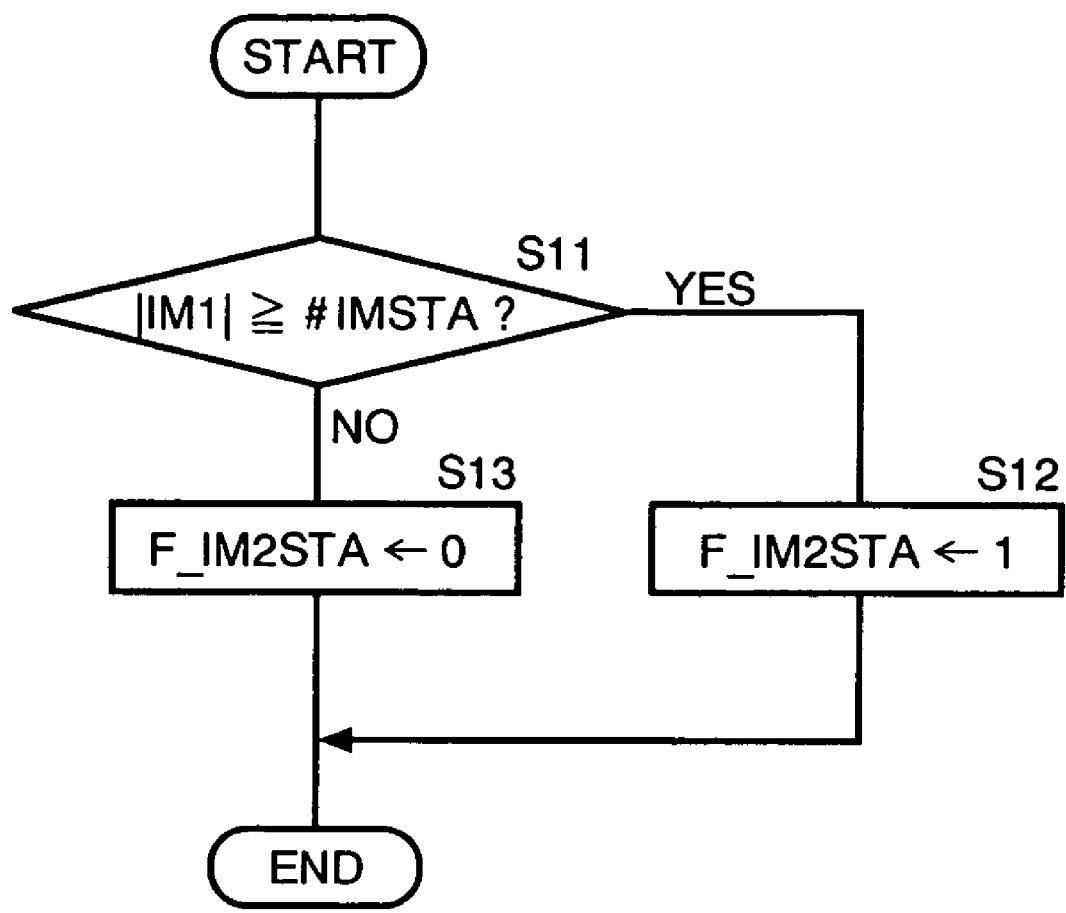
FIG. 7 is a flowchart for explaining the failure diagnosis operation carried out in the sub CPU.

The flowchart of FIG. 7 shows a process carried out by the sub CPU 62. Firstly, in Step S11 the absolute value of an actual current IM1 of the motor M calculated by the sub CPU 62 is compared with a threshold value #IMSTA (3 A in this embodiment), and if the absolute value of the actual current IM1 of the motor M is equal to or greater than the threshold value #IMSTA, then in Step S12 a flag F_IM2STA is set to 1, that is, the port Ps of the sub CPU 62 is set to a high level, whereas if in Step S11 the absolute value of the actual current IM1 of the motor M is less than the threshold value #IMSTA, then in Step S13 the flag F_IM2STA is set to 0, that is, the port Ps of the sub CPU 62 is set to a low level.

Figure 8:
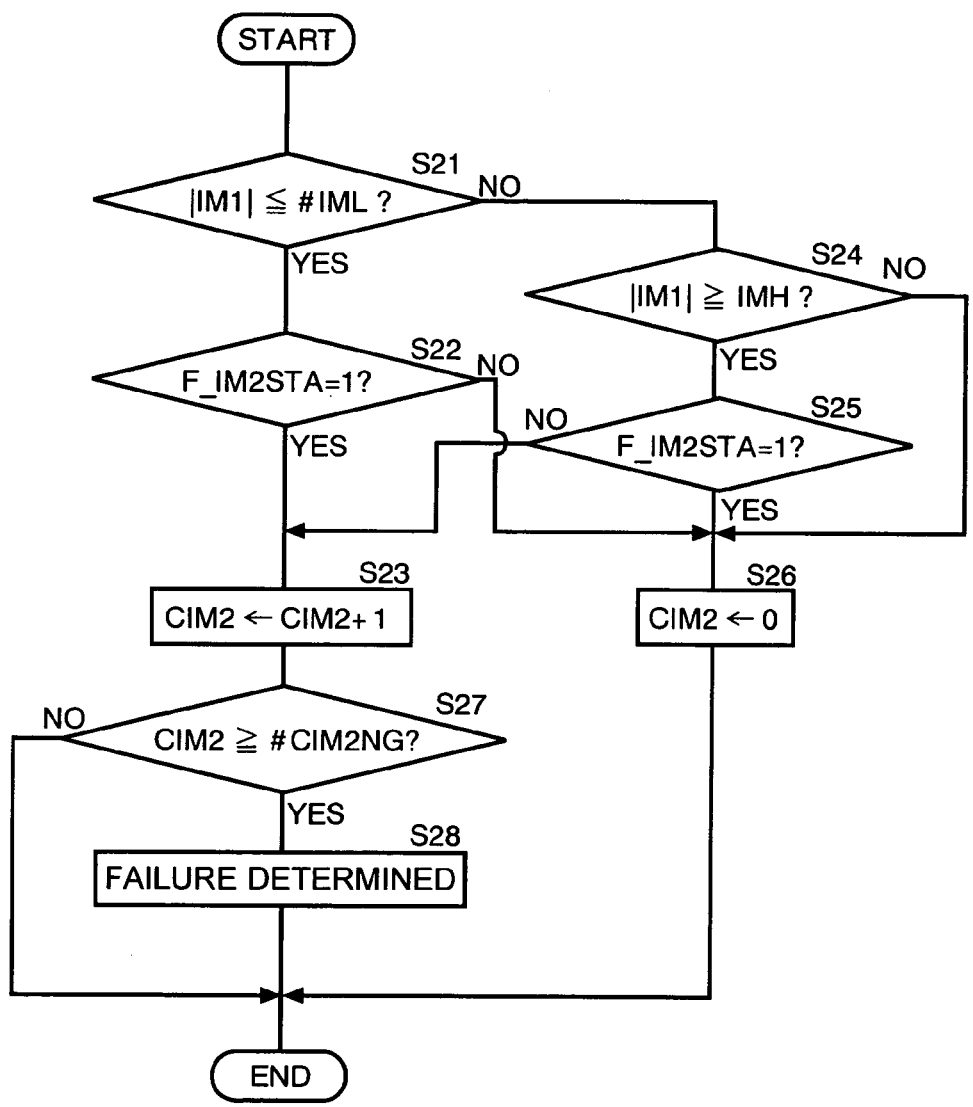
FIG. 8 is a flowchart for explaining the failure diagnosis operation carried out in the main CPU.

The flowchart of FIG. 8 shows a process carried out by the main CPU 61. Firstly, in Step S21 the absolute value of an actual current IM1 of the motor M calculated by the main CPU 61 is compared with a lower limit value #IML (0 A in the embodiment), and if the absolute value of the actual current IM1 of the motor M is equal to or less than the lower limit value #IML (that is, 0 A) and in Step S22 the flag F_IM2STA=1 (that is, the port Pm is at a high level), then it is determined that the actual current IM1 calculated by the sub CPU 62 does not coincide with the actual current IM1 calculated by the main CPU 61, and in Step S23 a failure counter CIM2 is incremented.

On the other hand, if in Step S22 the flag F_IM2STA=0 (that is, the port Pm is at a low level), since it cannot be determined that the actual current IM1 calculated by the sub CPU 62 does not coincide with the actual current IM1 calculated by the main CPU 61, in Step S26 the failure counter CIM2 is reset.

If in Step S21 the absolute value of the actual current IM1 of the motor M is greater than the lower limit value #IML, then in Step S24 the absolute value of the actual current IM1 of the motor M calculated by the main CPU 61 is compared with an upper limit value #IMH (6 A in the embodiment), and if the absolute value of the actual current IM1 of the motor M is equal to or greater than the upper limit value #IMH and in Step S25 the flag F_IM2STA=0 (that is, the port Pm is at a low level), then it is determined that the actual current IM1 calculated by the sub CPU 62 does not coincide with the actual current IM1 calculated by the main CPU 61, and in Step S23 the failure counter CIM2 is incremented.

On the other hand, if in Step S25 the flag F_IM2STA=1 (that is, the port Pm is at a high level), since it cannot be determined that the actual current IM1 calculated by the sub CPU 62 does not coincide with the actual current IM1 calculated by the main CPU 61, in Step S26 the failure counter CIM2 is reset. If in Step S24 the absolute value of the actual current IM1 of the motor M calculated by the main CPU 61 is less than the upper limit value #IMH, that is, the absolute value of the actual current IM1 is between 0 A and 6 A, it cannot be determined that the actual current IM1 calculated by the sub CPU 62 does not coincide with the actual current IM1 calculated by the main CPU 61, and in Step S26 the failure counter CIM2 is reset.

If in Step S27 the failure counter CIM2 is equal to or greater than a threshold value #CIM2NG, then in Step S28 it is determined that the actual current calculation function of the sub CPU 62 has locked up low or has locked up high, and the power relay 43 and the fail-safe relay 47 are turned OFF, thereby disabling the operation of the motor M.

As described above, the main CPU 61 and the sub CPU 62 independently calculate the actual current IM1 of the motor M; when the actual current IM1 calculated by the sub CPU 62 is equal to or greater than 3 A, the port Ps is set to a high level, and when it is less than 3 A, the port Ps is set to a low level. Then, the level of the port Pm of the main CPU 61, which is connected to the port Ps of the sub CPU 62, is compared with the actual current IM1 calculated by the main CPU 61 itself, and if the two clearly do not coincide with each other, it can be determined that the sub CPU 62 has locked up. Moreover, since the signal that the main CPU 61 receives from the sub CPU 62 only relates to the level of the port Pm, it is possible to minimize an increase in the load on the main CPU 61.

In accordance with the above-mentioned failure detection, since it is guaranteed that the sub CPU 62 correctly detects the actual current IM1 of the motor M, the motor drive disable circuit 52 can effectively exhibit the function of prohibiting the motor M from generating a torque in a direction opposite to the direction of steering torque by the driver.

Although an embodiment of the present invention has been described above, the present invention is not limited to the above-mentioned embodiment and can be modified in a variety of ways without departing from the subject matter of the present invention described in the claims.

For example, in the embodiment the offset voltage calculation request signal is sent to the sub CPU 62 after the offset voltage calculation in the main CPU 61 is completed, but an offset voltage calculation command may be sent to the sub CPU 62 at the same time as the offset voltage calculation request signal is sent to the main CPU 61.

Furthermore, in the embodiment, the actual current IM1 calculated by the sub CPU 62 is sent to the main CPU 61 as a high level signal or a low level signal, but an unprocessed actual current IM1 calculated by the sub CPU 62 may be sent directly to the main CPU 61.

What is claimed is:

1. An electric power steering system comprising:
   a motor for assisting a driver with a steering operation;
   motor current detection means for detecting a current supplied to the motor;
   a main CPU for carrying out control so that the current detected by the motor current detection means coincides with a target current;
   a sub CPU configured to communicate with the main CPU so as to monitor the main CPU;
   a motor drive circuit for driving the motor, said motor drive circuit including switching elements;
   a switching element drive circuit for controlling the switching elements; and
   a motor drive disable circuit disposed between said switching element drive circuit and said main and sub CPUs,
   wherein said motor drive disable circuit disables drive of the motor in a predetermined condition,
   the main CPU and the sub CPU individually calculate an offset voltage of the motor current detection means in order to calibrate the motor current detection means, wherein
   the main CPU calculates the offset voltage and sends an offset voltage calculation request signal to the sub CPU,
   upon communication between the main CPU and the sub CPU, the sub CPU calculates the offset voltage and sends an offset voltage calculation completion signal to the main CPU, and a normal condition is determined when the time from the main CPU offset voltage calculation to the offset voltage calculation complete signal being received from the sub CPU by the main CPU, falls within a predetermined period of time set by a timer.

2. The electric power steering system according to claim 1, wherein the main CPU and the sub CPU are independently configured to calculate the actual current of the motor, wherein the sub CPU sets a port connecting the main CPU and the sub CPU to a high level when the actual current of the motor detected by the sub CPU is equal to or greater than a threshold value, and sets the port to a low level when the detected actual current is less than the threshold value, and wherein the main CPU compares the actual current of the motor detected by the main CPU with the port level to determine whether or not the sub CPU has locked up.

3. The electric power steering system according to claim 2, wherein, when the actual current of the motor calculated by the main CPU is equal to or greater than an upper limit value if a state in which the port is at the low level continues for a predetermined period of time set by a counter, it is determined that the sub CPU has locked up low.

4. The electric power steering system according to claim 2, wherein, when the actual current of the motor calculated by the main CPU is equal to or less than a lower limit value if a state in which the port is at the high level continues for a predetermined period of time set by a counter, it is determined that the sub CPU has locked up high.

* * * * *